Patented Sept. 13, 1949

2,481,524

UNITED STATES PATENT OFFICE 2,481,524

QUATERNARY AMMONIUM STEROIDS AND PROCESS

Harold B. MacPhillamy and Caesar R. Scholz, Summit, N. J., assignors to Ciba Pharmaceutical Products, Incorporated, Summit, N. J., a corporation of New Jersey No Drawing. Application September 9, 1946, Serial No. 695,813

11 Claims. (Cl. 260—397.1)

This invention relates to methods for the introduction of double bonds into steroids and to products formed therein.

We have discovered that steroids containing double bonds are produced by converting an amino steroid to the corresponding quaternary derivative and treating the latter with an agent having an alkaline reaction. The amino group may be present originally either attached to a nuclear carbon or to a carbon atom in the side chain. It is necessary that there be one hydrogen atom at least attached to a carbon atom adjacent to the amino bearing carbon atom. The process of our invention is illustrated as follows:

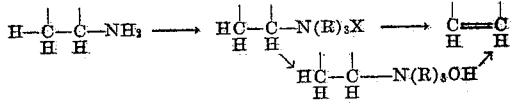

wherein the carbon atoms are part of a steroid nucleus or a side chain attached to a steroid nucleus, R is a lower alkyl radical and X is a halogen, sulfate, or a sulfate containing radical derived from dialkyl sulfates (e. g., $RSO_4^-$).

According to the process of our invention, an amino steroid is alkylated with an alkyl halide or dialkyl sulfate such as methyliodide, ethylbromide, ethyliodide, propylbromide, butyl bromide, dimethyl sulfate, etc., to form the corresponding quaternary ammonium salt. The latter on heating with an alkaline agent such as a metal hydroxide, i. e. sodium hydroxide, potassium hydroxide, lithium hydroxide, etc., loses trialkylamine, resulting in the formation of a double bond between the carbon to which the amino group is attached and the carbon adjacent which is most highly hydrogenated.

Our process for the production of unsaturated carbon to carbon linkages finds application in processes for the partial degradation of the side chain of sterols wherein the double bond is subjected to oxidation. Again, the process may be applied to the production of steroids containing a 20—21 double bond which, in turn, may be converted to products having the structure of the cortical or ovarian hormones at carbon atoms 20 and 21. Also, the process may be employed for the production of steroids containing a double bond in the 11—12 position and thus is useful in synthesizing the cortical hormones. The process is particularly advantageous because of freedom from by-products.

The quaternary amino steroids produced according to the present invention are readily isolated as such and are characterized by interesting properties both as regards their physiological action and as regards their use for further conversions.

In the examples below our process is illustrated as applied to 3,12-diacetoxy-20-aminopregnane; 3,12-diacetoxy-23-amino-cholane and methyl 3-acetoxy-12-amino-cholanate. It is to be understood that these examples are presented by way of illustration and not of limitation. The indicated temperatures are in degrees centigrade.

*Example 1*

14.0 g. of bisnordesoxycholic acid is acetylated by dissolving it in a mixture of 70 cc. of glacial acetic acid, 7 cc. of perchloric acid and 52.5 cc. of acetic anhydride and allowing it to stand for 15 minutes at room temperature. The mixture is then poured into cracked ice and water and extracted with benzene. The benzene extract is washed several times with water, dried and the solvent removed in vacuo.

The resulting semicrystalline mass is cooled in ice water and dissolved in 80 cc. of dry acetone. To this solution is added in one portion an ice cold solution of 6.5 grams of sodium azide in 17 cc. of water. The mixture is swirled in an ice bath for 5–10 minutes and then poured into a separatory funnel containing chopped ice, water and alcohol-free ether. After separation, the ethereal layer is poured into a flask without drying and the ether removed in vacuo at 0–10°. The residue is taken up in 150 cc. of glacial acetic acid and 115 cc. of water added slowly with warming on the steam bath. The mixture is finally heated on the steam bath for ¾ hour until the evolution of nitrogen stops. It is then cooled in an ice bath, about 2 liters of ether added and the solution made alkaline by the slow addition of 50% KOH solution. The ether layer is separated, the aqueous residue is extracted once again with ether; the combined ether extracts are washed with water, dried, the solvent removed on the steam bath and finally in vacuo at 100°. The residue is taken up in 1500 cc. of dry ether and gaseous hydrogen chloride passed into the solution. The precipitated 3,12-diacetoxy-20-amino pregnane hydrochloride is washed with ether and dryed in air. Yield 12.9 g. (73.5%).

To a solution of 6.0 g. of 3,12-diacetoxy-20-aminopregnane hydrochloride in 250 cc. of absolute ethanol, 59 g. of anhydrous $K_2CO_3$ and 50 g. of methyliodide are added. The mixture is refluxed for 48 hours on the steam bath, during which time four equally distributed further additions of 10 cc. of methyliodide and 10 g. of $K_2CO_3$ are made. The alcoholic solution is filtered and concentrated to dryness in vacuo. The resulting oily material is taken up in $CHCl_3$ and filtered. The $CHCl_3$ solution is then evaporated to dryness leaving the crude quaternary iodide.

This material is mixed with 16 cc. of water and 20 g. of sodium hydroxide. It is gradually heated in an oil bath to 180–190° when bubbling occurs with liberation of trimethylamine. The heating is continued for 1½ hours. It is allowed to cool and then dissolved in water. The insoluble material is extracted with ether and the ether solution washed, dried and the solvent removed. The yellow oil which remains is acetylated in the usual manner (with a mixture of acetic acid, acetic anhydride and perchloric acid). After recrystallization from methanol, 3,12-diacetoxy-$\Delta^{20}$-pregnene, M. P. 175–178° C. is obtained.

Alternatively, the crude quaternary iodide mentioned above is dissolved in a mixture of 50 cc. of water and 10 cc. of ethanol and then shaken with an excess of wet silver oxide at room temperature for ½ hour. The solution is filtered and the clear filtrate evaporated with a free flame until the temperature reaches 120–130° when 10 cc. of 10% sodium hydroxide is added and the heating continued at 150–160°. The purification procedure outlined above is then followed.

If desired, solvents other than alcohol may be used for the methylation step. Thus, the methylation is carried out using acetone as the solvent. The inorganic salts are filtered off directly and no chloroform is needed. The quaternary salt is purified by dissolving the crude material in water, making it alkaline with NaOH, and extracting any incompletely methylated amines with ether. The aqueous phase containing the quaternary salt is evaporated to dryness and freed from inorganic salts with chloroform. The oil obtained on evaporation of the solvent is crystallized from acetone, yielding 3-hydroxy-12-acetoxy-20-amino-pregnane trimethyl ammonium iodide, M. P. 238–240°, with decomposition. After resolidification it remelts at 285–290°.

The methyl iodide in the foregoing may equally as well be replaced by ethyl bromide, propyl iodide, butyl bromide, or the like.

Example 2

18 g. of 3,12-diacetoxy cholanic acid is treated with thionyl chloride, sodium azide, etc., as described above in Example 1, to yield 14 g. of 3,12-diacetoxy-23-amino-norcholane hydrochloride.

6.0 g. of 3,12-diacetoxy-23-aminonorcholane hydrochloride is methylated in alcohol solution as previously described and yields an amorphous product. This is purified by dissolving in water, alkalinization and extraction with ether. The alkaline aqueous phase is concentrated to dryness in vacuo and the residue extracted with chloroform. The solution is dried and the solvent removed yielding the crude quaternary iodide.

This material is converted to the quaternary hydroxide by treatment with silver oxide by the method described in Example 1. The insoluble silver salts are filtered and after the addition of 5 cc. of 50% NaOH to the filtrate, it is boiled down until most of the water has been removed. It is then heated at 150–160° for three hours. After cooling and dilution with water, it is extracted with ether. The ether solution is dried and the solvent removed. The residue, after acetylation, yields an oil. This purified by chromatographing it in petroleum ether-benzene solution on alumina to give the crystalline 3,12-diacetoxy-$\Delta^{22}$-norcholene melting at 142–144°.

The methylation step in this example may also be carried out with dimethyl sulfate in acetone solution, for instance in lieu of the indicated methyl iodide.

Example 3

To a solution of 18 g. of 3-hydroxy-12-ketocholanic acid in 100 cc. of ethanol, 1.1 mols. of hydroxylamine hydrochloride and sodium acetate are added. The mixture is refluxed for three hours, cooled and diluted with water to cloudiness. On standing 3-hydroxy-12-oximino-cholanic acid separates as crystals, melting at 201–203° after recrystallization from ether.

This material is reduced by dissolving it in 250 cc. of dry isoamyl alcohol, heating to boiling and adding rapidly 23 g. of sodium. After the first violent reaction has subsided, the mixture is kept rapidly boiling by heating with a free flame until all the sodium has reacted. It is then partially cooled and poured into 1500 cc. of cracked ice and water. It is allowed to stand until all the alcoholate has decomposed and the excess isoamyl alcohol is separated. The alkaline aqueous phase is extracted once with ether and then acidified with concentrated hydrochloric acid. On standing, the colorless crystalline amine hydrochloride separates. It is filtered off, washed with water and recrystallized from alcohol-ether mixture. The 3-hydroxy-12-amino-cholanic acid hydrochloride melts in excess of 325° C.

The above hydrochloride is esterified by refluxing it for three hours in 100 cc. of ethanol with 3 cc. of concentrated sulfuric acid. About 75% of the alcohol is then removed in vacuo and the residue diluted with an excess of water. The solution is made alkaline with 10% sodium carbonate solution. The precipitated oil is extracted with ether and washed well with water. The solution is dried and the solvent removed. The resulting oil is directly methylated.

6.7 g. of ethyl-3-hydroxy-12-amino-cholanate is methylated by dissolving it in 100 cc. of absolute ethanol, adding 20 g. of potassium carbonate, 50 g. of methyliodide and refluxing for 48 hours. Two additional amounts of 10 g. of potassium carbonate and 30 g. of methyliodide are added during the reaction.

At the end of this time the inorganic salts are filtered off, washed with alcohol, and the combined filtrates concentrated to dryness. The residue is dissolved in chloroform, filtered and the filtrate concentrated to dryness. The residue is taken up in 20 cc. of acetone and petroleum-ether added to cloudiness. On standing overnight in the icebox crystals separate. The ethyl-3-hydroxy-12-amino-cholanate-trimethylammonium iodide melts at 158–160° with gas evolution, solidification and remelting at 290°. The mother liquor contains some unmethylated and partially methylated material which is added to subsequent batches.

To a suspension of 2.0 g. of the above quaternary salt in 3 cc. of water is added 3 cc. of a solution of 5 g. of potassium hydroxide in 4 cc. of water. The mixture is stirred rapidly and heated slowly in a Wood's metal bath to 180°. A volatile alkaline material (trimethylamine) can be detected at 135°. Additional water is added to replace that lost by evaporation. The mixture is heated at 180° for ¾ hour, when no more volatile base can be detected. It is slowly cooled and diluted with 25 cc. of water. The alkaline solution is decanted from some insoluble gum and this is dissolved in 50 cc. of water. The combined solutions are filtered and acidified with concentrated HCl. The precipitated acid is extracted with ether, washed with water, sodium bisulfite solution, and water. It is dried with sodium sulfate and the solvent removed.

For purification the oil remaining is esterified with diazomethane and the ester acetylated with acetic anhydride and pyridine. The resulting acetate ester is chromatographed on alumina in benzene-petroleum ether (50–50) solution. The column is washed with 100 cc. of this mixture and eluted with pure benzene. After evaporation of the benzene and recrystallization from methanol, methyl-3-acetoxy-$\Delta^{11}$-cholenate is obtained. M. P. 117–118° and $[\alpha]_D = +56°$.

We claim:

1. A cyclopentano-10:13-dimethyl-polyhydrophenanthrene containing a lower alkyl substituted quaternary ammonium group, the nitrogen atom of the said quaternary ammonium group being bound to a secondary carbon atom.

2. A cyclopentano-10:13-dimethyl-polyhydrophenanthrene containing a lower alkyl substituted quaternary ammonium group, the nitrogen atom of the said quaternary ammonium group being bound to a secondary nuclear carbon atom.

3. A cyclopentano-10:13-dimethyl-polyhydrophenanthrene containing a lower alkyl substituted quaternary ammonium group, the nitrogen atom of the said quaternary ammonium group being bound to a secondary carbon atom which is part of a side chain attached to the polyhydrophenanthrene nucleus.

4. A cyclopentano-10:13-dimethyl-polyhydrophenanthrene of the formula

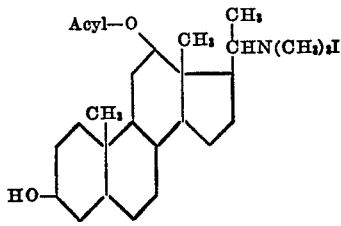

5. A cyclopentano-10:13-dimethyl-polyhydrophenanthrene of the formula

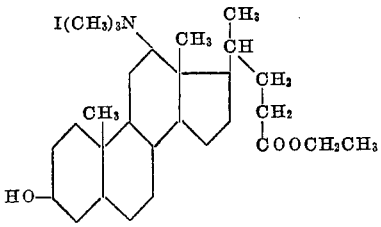

6. The process of preparing an unsaturated steroid of the cyclopentano-10:13-dimethyl-polyhydrophenanthrene series which comprises completely alkylating an amino steroid of the said series wherein the nitrogen atom of the amino group is bound to a secondary carbon atom, and heating the resulting quaternary amino steroid with an alkali.

7. The process of preparing an unsaturated steroid of the cyclopentano-10:13-dimethyl-polyhydrophenanthrene series which comprises completely methylating an amino steroid of the said series wherein the nitrogen atom of the amino group is bound to a secondary carbon atom, and heating the resulting quaternary amino steroid with an alkali.

8. The process of preparing 3,12-diacyloxy-$\Delta^{20}$-pregnene which comprises alkylating 3,12-diacyloxy-20-amino pregnane and heating the resulting quaternary salt with an alkali.

9. The process of preparing 3,12-diacetoxy-$\Delta^{20}$-pregnene which comprises methylating 3,12-diacetoxy-20-amino pregnane and heating the resulting quaternary salt with an alkali.

10. The process of preparing 3-acyloxy-$\Delta^{11}$-cholenic acid which comprises alkylating methyl-3-acyloxy-12-amino-cholanate and heating the resulting quaternary salt with an alkali.

11. The process of preparing 3-acetoxy-$\Delta^{11}$-cholenic acid which comprises methylating methyl-3-acetoxy-12-amino-cholanate and heating the resulting quaternary salt with an alkali.

HAROLD B. MacPHILLAMY.
CAESAR R. SCHOLZ.

REFERENCES CITED

The following references are of record in the file of this patent:

UNITED STATES PATENTS

| Number | Name | Date |
|---|---|---|
| 2,252,863 | Raymond | Aug. 19, 1941 |

OTHER REFERENCES

Echhardt, Berichte 71, pages 461–470 (1938). (Copy in Scientific Library.)